United States Patent [19]

Kwok et al.

[11] Patent Number: 5,651,005
[45] Date of Patent: Jul. 22, 1997

[54] SYSTEM AND METHODS FOR SUPPLYING CONTINUOUS MEDIA DATA OVER AN ATM PUBLIC NETWORK

[75] Inventors: Timothy C. Kwok, Kirkland; Yoram Bernet, Seattle; John R. Douceur, Bellevue, all of Wash.

[73] Assignee: Microsoft Corporation, Redmond, Wash.

[21] Appl. No.: 616,577

[22] Filed: Mar. 15, 1996

Related U.S. Application Data

[63] Continuation of Ser. No. 520,555, Aug. 29, 1995.
[51] Int. Cl.$^6$ .................... H04L 12/28; H04N 7/10
[52] U.S. Cl. .................... 370/399; 370/420; 348/6; 348/7
[58] Field of Search .................... 370/60, 60.1, 110.1, 370/94.1, 94.2, 356, 360, 386, 390, 399, 411, 420; 455/3.1, 4.1, 4.2; 348/6, 7

[56] References Cited

U.S. PATENT DOCUMENTS

| | | | |
|---|---|---|---|
| 5,038,343 | 8/1991 | Lebizay et al. | 370/60 |
| 5,274,643 | 12/1993 | Fisk | 370/94.1 |
| 5,528,282 | 6/1996 | Voeten et al. | 348/7 |
| 5,544,161 | 8/1996 | Bigham et al. | 370/58.1 |
| 5,550,578 | 8/1996 | Hoarty et al. | 348/7 |
| 5,555,244 | 9/1996 | Gupta et al. | 370/60.1 |
| 5,557,317 | 9/1996 | Nishio et al. | 348/7 |

Primary Examiner—Hassan Kizou
Assistant Examiner—A. Bnimoussa
Attorney, Agent, or Firm—Lee & Hayes, PLLC

[57] ABSTRACT

Described herein is an ATM switch having a plurality of switch ports for connection to a public ATM network and to a plurality of data handlers. Each data handler is configured to supply respective portions of a continuous data stream to a requesting end-point device through the public ATM network. To request a particular continuous data stream, an end-point device sends a request to a controller associated with the data handlers, rather to each of the individual data handlers. The controller in the preferred embodiment is a dedicated computer, although it is also possible to designate one of the data handlers to perform the functions of the controller. In response to receiving a request from an end-point device, the controller establishes a multipoint-to-point virtual connection between the end-point device and the data handlers which will supply portions of the requested continuous data stream. The switch port selected to establish the virtual connection with the end-point device is configured as the user side of a standard ATM user-to-network interface (UNI), and its ATM address is used as the calling party address in establishing the virtual connection with the end-point device. Once the connections are established, the data handlers begin supplying their data portions. The ATM switch merges these data portions into a single data stream and supplies it to the requesting end-point device through the single virtual connection between the ATM switch and the end-point device.

33 Claims, 3 Drawing Sheets

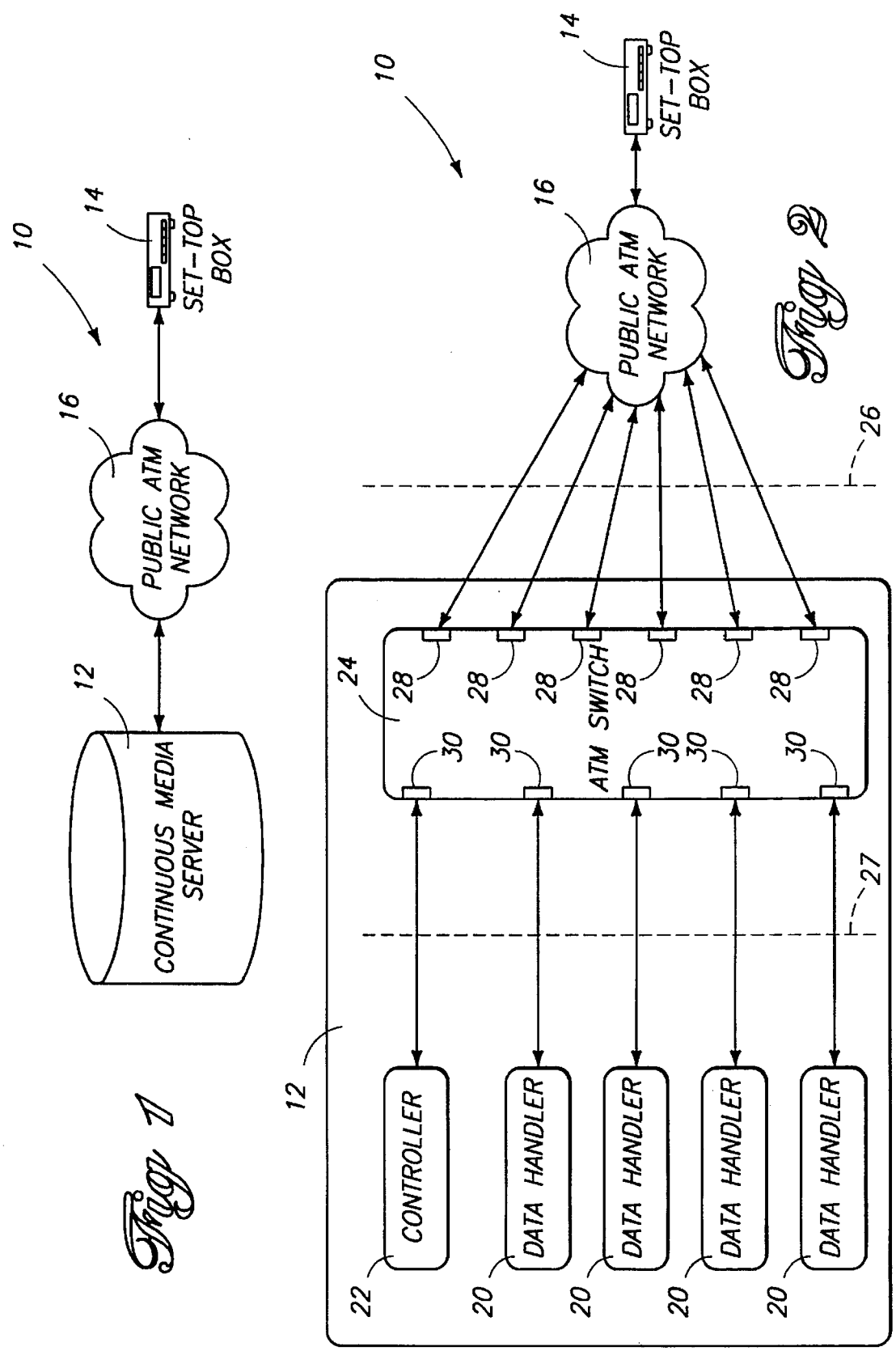

SYSTEM AND METHODS FOR SUPPLYING CONTINUOUS MEDIA DATA OVER AN ATM PUBLIC NETWORK

RELATED APPLICATIONS

This is a continuation of U.S. patent application Ser. No. 08/520,555, filed Aug. 29, 1995.

TECHNICAL FIELD

This invention relates to ATM networks, particularly to such networks used for transferring continuous media data from a cable TV distribution headend to set-top boxes in individual subscribers' homes.

BACKGROUND OF THE INVENTION

This invention arose during development of a continuous media server at Microsoft® Corporation. This media server will be used in conjunction with interactive TV systems to provide video-on-demand services. Video-on-demand services allow a cable television subscriber viewer to select a movie or other video and to view it on his or her own time schedule. This is different than "pay-per-view" services that generally offer only a limited number of movies at specific starting times. Video-on-demand allows different viewers to select different movies for viewing at arbitrary times.

Video-on-demand utilizes digital data transmission capabilities of cable TV and/or telephone distribution systems. In the system being developed by Microsoft®, a cable headend supplies multiple independent video streams to set-top boxes in individual subscribers' homes. At the headend, a plurality of cooperating data handlers supply the video streams. Each data handler comprises a conventional computer with a high-capacity disk storage system. The data for a single video stream is distributed over all the data handlers. The data handlers cooperate to merge their various portions of data into a single continuous data stream. For instance, one data handler might supply the first second of video data and then hand off to another data handler for the next second of video data.

While the Microsoft® continuous media server is network-independent, it is currently contemplated that best performance will be achieved when using ATM (asynchronous transfer mode) as a networking transport. ATM offers quality of service guarantees and scalability to high bandwidths, both of which are valuable when transmitting large numbers of independent data streams. It is desirable to use ATM technology for headend to user connections as well as for switching and connections within the headend itself.

Implementing the Microsoft® continuous media server on ATM presents several challenges. One challenge is to keep interactions between end-point devices and the media server relatively simple. For instance, it would be undesirable to require a set-top box to communicate with all of the data handlers in order to request a video stream. Rather, the continuous media server should appear as a single device which sources a single, merged data stream. Any complexities in merging data from separate data handlers should be transparent to the set-top box. The architectures and methods described below accomplish this objective.

SUMMARY OF THE INVENTION

The invention includes a continuous media server at a cable distribution headend. The continuous media server is connected through a public ATM network to a plurality of set-top boxes in individual subscribers' homes.

The continuous media server comprises an ATM switch and a plurality of data handlers. The ATM switch is connected to communicate with the data handlers and with the public ATM network.

The data handlers cooperate to supply data streams representing continuous media content such as movies. The data for a single movie is distributed over several data handlers, and the data handlers take turns sending the data to the ATM switch. The ATM switch merges the data from the data handlers into a single data stream and transmits this single data stream to a user's set-top box.

To order a movie, the set-top box sends a data request to a controller at the cable system headend. The set-top box does not need to know the ATM addresses of the data handlers. In fact, the set-top box does not even need to know of the data handlers' existence. Rather, the set-top box needs only to know the single ATM address of the controller.

In response to receiving the data request, the controller sends a multipoint-to-point connection message to the ATM switch. In response to this message, the ATM switch sets up individual virtual connections to each data handler which will participate in providing data. The ATM switch also sets up a single virtual connection from the ATM switch to the requesting set-top box. In setting up this connection, the ATM switch uses a downstream switch port which is implemented as the user side of a standard ATM user-to-network interface (UNI), having its own ATM address. Because of this, the set-top box communicates with only a single entity to receive continuous media data. The ATM switch accepts data from the various data handlers and merges the data into a single data stream for transmission to the set-top box.

BRIEF DESCRIPTION OF THE DRAWINGS

FIG. 1 is a block diagram showing overall components of a continuous media distribution system in accordance with a preferred embodiment of the invention.

FIG. 2 is a block diagram showing the system of FIG. 1 in more detail.

DETAILED DESCRIPTION OF PREFERRED EMBODIMENTS

Figure 3:
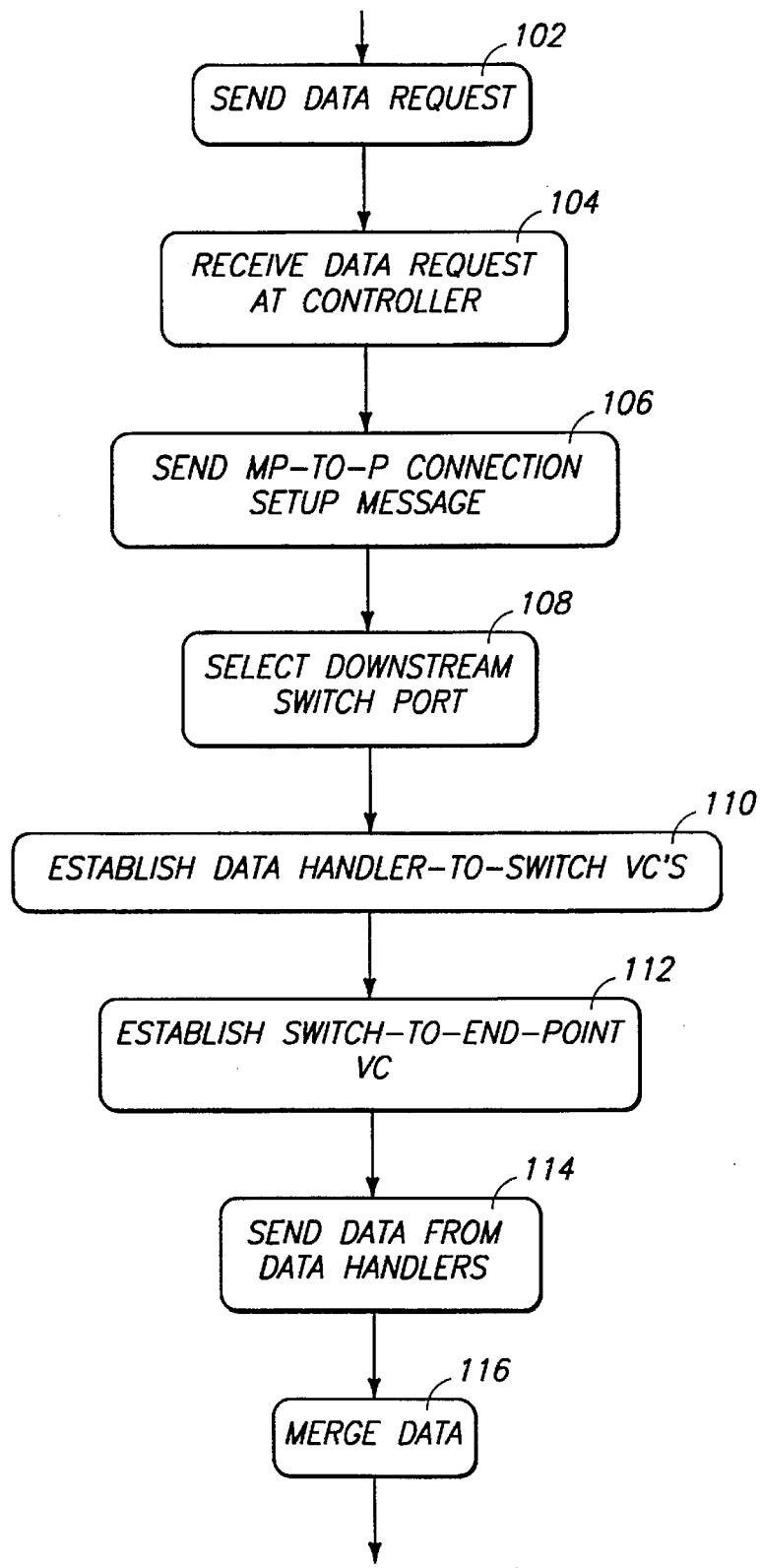
FIG. 3 is a flow chart showing methodological steps in accordance with one embodiment of the invention.

FIG. 1 shows a continuous media distribution system and network in accordance with a preferred embodiment of the invention, generally labeled with the reference numeral 10. The system includes a continuous media server 12 and an end-point device 14, connected to communicate through an existing public ATM network 16. This network might include corporate, in-house network facilities as well as public distribution media including residential access networks. Residential access networks might include, for example, hybrid-fiber-coax systems, fiber-to-the-curb systems, fiber-to-the-home systems, and systems using an asymmetric digital subscriber loop (ADSL). In the Microsoft® system described above, continuous media server 12 is located at a cable TV system's headend, a telephone company's central office, or a third-party service provider premises, to supply a plurality of continuous data streams to requesting end-point devices 14 through ATM network 16. In this environment, end-point device 14 is a set-top box associated with a cable subscriber's television. Set-top boxes are sometimes referred to as subscriber interface units. A continuous data stream is defined as a stream of data units which generally need to be transmitted, received, and interpreted isochronously in order to preserve their value and meaning.

FIG. 2 shows distribution system and network 10 in more detail. Continuous media server 10 has a plurality of data handlers 20 which cooperate as described above to supply portions of continuous data streams representing movies, videos, audio segments, and/or other types of continuous media content. Each continuous data stream is distributed over a plurality of data handlers 20, and the data handlers take turns supplying their respective portions of particular data streams to requesting end-point devices 14. Each data handler is thus configured to supply respective portions of the continuous data stream to a requesting end-point device through the public ATM network. The media server optionally includes a data handler controller 22 associated with the data handlers to coordinate them. The functions of controller 22 could alternatively be performed by one of data handlers 20.

Continuous media server 10 also has an ATM switch 24 to facilitate communications between the data handlers and the public ATM network. ATM switch 24 is connected to public ATM network 24 at what is preferably a standard public user-to-network interface (UNI) 26, and to controller 22 and data handlers 20 at a standard private user-to-network interface (UNI) 27. More specifically, ATM switch 24 has a plurality of ATM switch ports 28 for connection to the public ATM network, and a plurality of ATM switch ports 30 for connection to other devices such as data handlers 20 and controller 22. The controller and data handlers are connected to communicate with the public ATM network and ultimately with end-point devices 14 through ATM switch ports 30. The controller and each data handler have their own respective ATM addresses.

In order to transmit a continuous data stream to an end-point device, the continuous media server must coordinate the efforts of the various data handlers. This could be accomplished by requiring the end-point device to establish individual virtual connections with each data handler through public ATM network 16 and ATM switch 24. However, this would require the end-point device to know details about the internal workings of the continuous media server. For instance, the end-point device would need to know the ATM addresses of the data handlers on which the requested data resides. This information, however, can change with time and will often also depend on the specific data stream requested.

In the preferred embodiment described herein, the end-point devices do not need to communicate with the individual data handlers or even to know of their existence. Rather, an end-point device communicates with a controller at a single ATM address to request a continuous data stream. When the data is eventually supplied, it appears to the end-point device to be coming from a single ATM source.

FIG. 3 shows preferred methods implemented by the various devices of FIG. 2 in accordance with one embodiment of the invention. Initially, end-point device 14 performs a step 102 of sending a data request to data handler controller 22. The data request is sent over a bi-directional virtual channel connection from the end-point device to the single ATM address of controller 22. The virtual channel is set up beforehand in accordance with standard Q.2931 signaling messages, using the ATM address of end-point device 14 as the calling party address and the ATM address of controller 22 as the called party address. In step 104, the controller receives the data request at its single ATM address and responds by performing step 106.

Note that the controller in the preferred embodiment is external to ATM switch 24. However, functions performed by the controller in the preferred embodiment might alternatively be performed by the ATM switch itself. As another alternative, a controller might be supplied as a separate device from the data handler controller for communications with end-point devices. As already mentioned, the functions of the controller could also be performed by a designated one of the data handlers.

Step 106 comprises sending a third-party multipoint-to-point connection setup message from controller 22 to ATM switch 24. This message could alternatively be a first-party multipoint-to-point setup message in the case where a data handler functions as the controller. In either case, the setup message contains information and parameters which allow switch 24 to set up individual virtual channels between participating data handlers and to merge data from the data handlers into a single virtual channel to the end-point device. Specifically, the multipoint-to-point connection setup message specifies (1) the ATM addresses of ing the individual data handlers; (2) the ATM address of the requesting end-point device; (3) a requested peak cell rate for the respective ATM virtual connections from the individual data handlers; (4) an optional requested sustainable or average cell rate for the respective ATM virtual connections from the individual data handlers; (5) an optional derating factor; (6) an optional fan-in parameter indicating the number of data handlers which will eventually be expected to participate in the connection; (7) an optional burst size indicating the size or length of the portion of data supplied by each data handler, (8) an optional call ID parameter identifying the particular multipoint-to-point connection and distinguishing it from any other potential multipoint-to-point connections to the same end-point device.

The peak and sustained cell rates indicate characteristics of data flow from an individual data handler to switch 24. In the preferred embodiment, each data handler will supply data in shorts bursts. While the peak cell rate from the data handler might be great, its sustainable or average cell rate will be considerably less. For example, if there are five data handlers cooperating to supply a continuous data stream, the peak or burst cell rate of any particular data handler might be 5 megabits/second. However, the average or sustainable cell rate would only 1 megabit/second (peak rate/number of participating data handlers). In practice, it is preferable to increase the requested sustainable cell rate over its nominal value to allow for the case when one data handler unexpectedly fails. In such a case, the remaining data handlers would have to take over for the failed data handler, thereby increasing the sustainable cell rate for each of the remaining data handlers.

Rather than arbitrarily increasing the specified sustainable cell rate, a derating factor can be supplied. The derating factor indicates the factor by which cell rates from each data handler would increase if a single data handler were to fail. Assuming that five data handlers are originally participating, each data handler might require a sustainable cell rate of 1 megabit/second. If one were to fail, the remaining four would attempt to assume its extra duties. Each of the remaining four data handlers would then require a sustainable cell rate of 1.25 megabits/second, a 25% increase over their original requirements of 1 megabit/second. Thus, in this example, 0.25 or 25% would be the derating factor.

Requested cell rates and the derating factor can be used by switch 24 in performing resource allocation.

Instead of sending a single connection setup message, the controller might alternatively send a plurality of individual multipoint-to-point setup messages—one message corresponding to each data handler expected to contribute data to the eventual continuous data stream. In this case, ATM switch 24 would reply individually to each setup message.

ATM switch 24 performs several steps in response to receiving the third-party multipoint-to-point connection setup message. In step 108, switch 24 selects one of its switch ports 28 for downstream communications with the requesting end-point device. Preferably, this selection is based on the available bandwidth of the switch port relative to other switch ports, to balance the loads on the respective switch ports. Specifically, the port currently having the lowest load is chosen for communications with the end-point device. Optionally, controller 22 might query switch 24 before sending the multipoint-to-point connection setup message to determine the desired switch port. In this case, the selected switch port would be designated in the multipoint-to-point connection setup message.

In step 110, switch 24 establishes respective point-to-point virtual channel connections with individual data handlers to allow data transfer from the data handlers to the ATM switch. Standard Q.2931 signaling messages (for example setup, call proceeding, and connect messages) are used to set up these virtual connections. Q.2931 signaling messages have provisions for including peak and sustainable cell rate parameters, as well as for specifying types of connections (such multipoint-to-point connections). These parameters are specified as indicated above. Switch 24 preferably makes use of these parameters in allocating its resources.

In step 112, ATM switch 24 establishes a single point-to-point ATM virtual connection from the selected switch port to the requesting end-point device. This virtual connection is again established using standard Q.2931 signaling messages—by sending a connection setup message from the selected switch port. Switch 24 is configured to implement each switch port 28 as the user side of a standard ATM public user-to-network interface (UNI), rather than as a network node. Thus, each of switch ports 28 has its own ATM address, and the ATM address of the selected switch port is used as the calling party address in the connection setup message.

Once the virtual connections are established between the individual data handlers and ATM switch 24, and between ATM switch 24 and the end-point device, a step 114 is performed of sending respective portions of a continuous data stream from the individual data handlers over the respective ATM virtual connections from the data handlers.

Step 116, performed by ATM switch 24, comprises merging the respective virtual connections from the data handlers into the single point-to-point ATM virtual connection to the requesting end-point device. The requesting end-point device thus receives the single continuous data stream over the single ATM virtual connection from the selected switch port.

Figure 4:
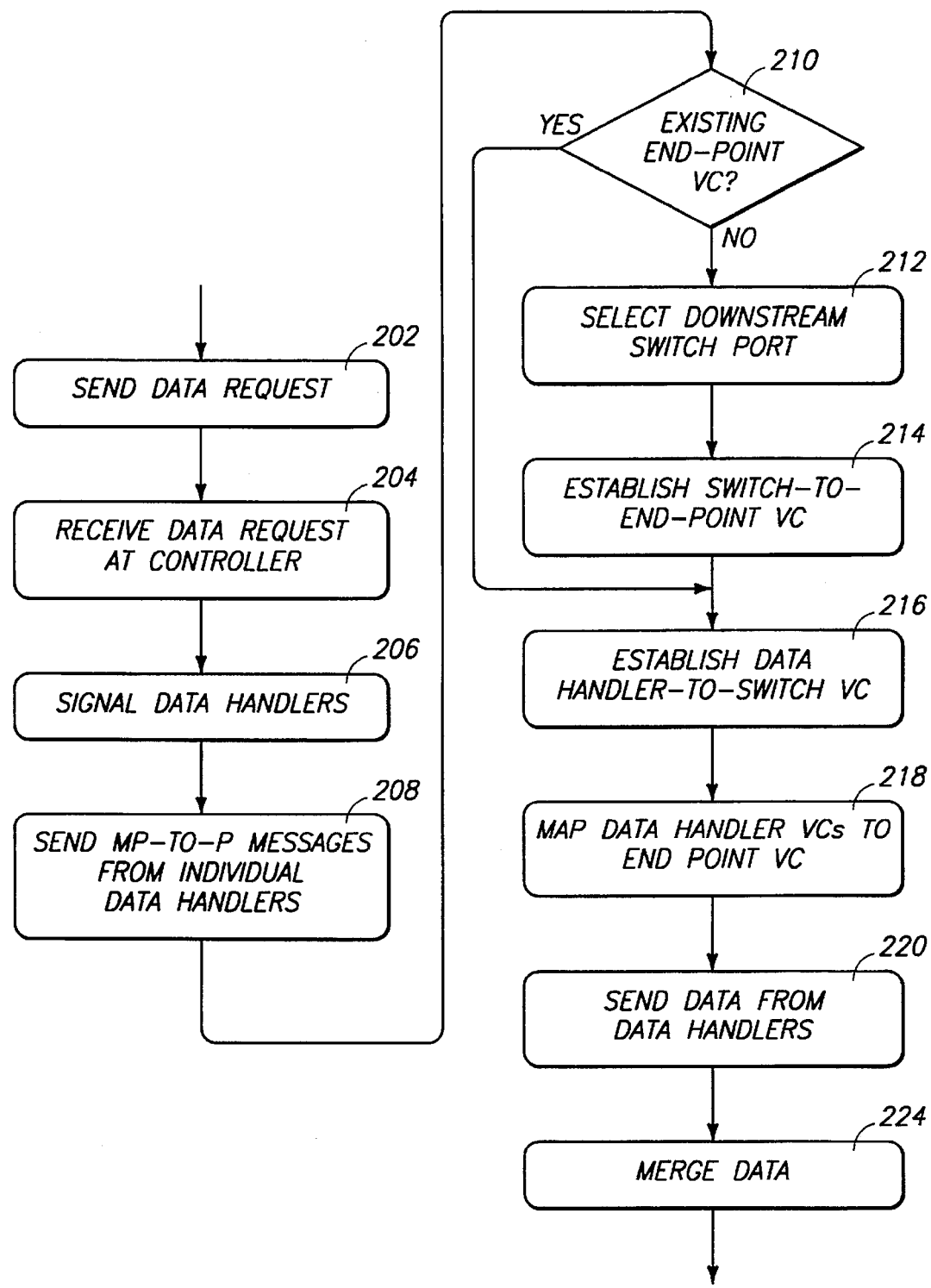
FIG. 4 is a flow chart showing methodological steps in accordance with another embodiment of the invention.

FIG. 4 shows alternative methods in accordance with the invention for establishing a multipoint-to-point virtual connection from headend 12 to end-point device 14. Initially, end-point device 14 performs a step 202 of sending a data request to data handler controller 22. The data request is sent over a bi-directional virtual channel connection from the end-point device to the single ATM address of controller 22 as already described in conjunction with FIG. 3. In step 204, the controller receives the data request at its single ATM address and responds by performing step 206.

Step 206 comprises signaling individual data handlers to supply their respective portions of the individual data stream to the requesting end-point device. Such signaling is accomplished using conventional out-of-band messaging protocols.

In response to signaling step 206, each data handler performs a step 208 of sending a respective multipoint-to-point connection setup message to ATM switch 24. Such a setup message from a single data handler specifies an ATM virtual connection to the requesting end-point device. This allows switch 24 to either create the specified virtual connection to the end-point device, or to add the data handler to an existing virtual connection to the end-point device.

More specifically, the multipoint-to-point connection setup message from an individual data handler specifies (1) the ATM address of the individual data handler; (2) the ATM address of the requesting end-point device; (3) a requested peak cell rate for the respective ATM virtual connections from the individual data handler; (4) an optional requested sustainable or average cell rate for the respective ATM virtual connections from the individual data handlers; (5) an optional derating factor; (6) an optional pseudo address; (7) an optional fan-in parameter; and (8) an optional burst size.

The peak and sustained cell rates and the derating factor are identical to those already described. The pseudo address uniquely specifies a virtual connection to an ATM end-point device. If only a single multipoint-to-point connection were ever established to each end-point, the connection could be uniquely specified by the end-point's ATM address. A pseudo address is used, however, to allow multiple multipoint-to-point connections to a single end-point device. The pseudo address further qualifies the end-point, allowing the ATM switch to distinguish different multipoint-to-point connections to the same end-point.

For single stage switches, the first bandwidth bottleneck will probably be at the selected switch port—the output of the multipoint-to-point connection from the switch. If this is the case, the only information useful to the switch, for the purpose of bandwidth management, is the peak cell rate and the guarantee that traffic will be submitted from only one data handler at a time. In this case, fan-in and derating parameters are probably unnecessary.

ATM switch 24 receives the multipoint-to-point connection setup message from the individual data handlers and in response determines whether the specified virtual connection to the end-point device has already been established, as indicated by decision block 210. If the specified connection is not yet established, a step 212 is performed of selecting a downstream switch port. This step preferably accomplishes load balancing as described above in conjunction with FIG. 3.

ATM switch 24 then, in step 214, establishes a single point-to-point ATM virtual connection from the selected switch port to the requesting end-point device. This virtual connection is again established using standard Q.2931 signaling messages—by sending a connection setup message from the selected switch port. Switch 24 is configured to implement the selected switch port as the user side of a standard ATM public user-to-network interface (UNI), rather than as a network node. Thus, each of switch ports 28 has its own ATM address, and the ATM address of the selected switch port is used as the calling party address in the connection setup message.

After step 214, or after step 210 if the specified virtual connection already exists, a step 216 is completed of establishing an ATM virtual connection from the sending data handler to the ATM switch. Again, this is completed using standard Q.2931 signaling messages (for example setup, call proceeding, and connect messages).

After step 216, switch 24 performs a step 218 of mapping the established ATM virtual connection from the sending data handler to the established virtual connection to the requesting end-point device.

Steps 210, 212, 214, 216, and 218 are actually performed relative to each data handler that sends a multipoint-to-point connection setup message.

Once the virtual connections are established between the individual data handlers and ATM switch 24, and between ATM switch 24 and the end-point device, the data handlers in step 220 send their respective portions of the continuous data stream over the respective ATM virtual connections from the data handlers.

Step 224, performed by ATM switch 24, comprises merging the respective virtual connections from the data handlers into the single point-to-point ATM virtual connection to the requesting end-point device. The requesting end-point device thus receives the single continuous data stream over the single ATM virtual connection from the selected switch port.

The physical architecture and methodological steps described above allow an end-point device to request a continuous data stream, which will eventually come from a plurality of ATM devices, by communicating with only a single ATM address. Likewise, the data stream is supplied from what appears to the end-point device to be a single ATM address.

In compliance with the statute, the invention has been described in language more or less specific as to structural and methodical features. It is to be understood, however, that the invention is not limited to the specific features described, since the means herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. A method of supplying a continuous data stream from a plurality of data handlers through an ATM switch, the ATM switch having a plurality of switch ports for connection to the data handlers and to a public ATM network, each data handler being configured to supply respective portions of the continuous data stream to a requesting end-point device through the public ATM network, the method comprising the following steps:

receiving a data request at a single ATM address from a requesting end-point device;

in response to receiving said data request:

establishing respective ATM virtual connections from the data handlers to the ATM switch;

establishing a single point-to-point ATM virtual connection from a selected one of the switch ports of the ATM switch to the requesting end-point device, said selected switch port having its own ATM address which is used as the calling party address in establishing the single ATM virtual connection;

sending respective portions of a continuous data stream from individual data handlers over the respective ATM virtual connections from the data handlers;

merging the respective virtual connections from the data handlers into the single point-to-point ATM virtual connection to the end-point device, wherein the requesting end-point device receives the single continuous data stream over the single ATM virtual connection from the selected one of the switch ports.

2. A method as recited in claim 1 and further comprising selecting the selected one of the switch ports based on its available bandwidth relative to other switch ports.

3. A method as recited in claim 1, the selected switch port implementing the user side of a standard ATM public user-to-network interface.

4. A method as recited in claim 1, wherein the step of establishing respective ATM virtual connections comprises sending individual requests to the ATM switch corresponding to the respective data handlers.

5. A method of supplying a continuous data stream from a plurality of data handlers through an ATM switch, the ATM switch having a plurality of switch ports for connection to the data handlers and to a public ATM network, each data handler being configured to supply respective portions of the continuous data stream to a requesting end-point device through the public ATM network, the method comprising the following steps:

receiving a data request at a single ATM address from a requesting end-point device, said data request including the ATM address of the requesting end-point device;

in response to receiving said data request from the requesting end-point device, sending one or more multipoint-to-point connection setup messages to the ATM switch;

the ATM switch receiving the multipoint-to-point connection setup messages and in response:

selecting one of the switch ports from among the plurality of switch ports of the ATM switch;

sending a connection setup message to establish a single point-to-point ATM virtual connection from the selected switch port of the ATM switch to the requesting end-point device, said selected switch port having its own ATM address which is used as the calling party address in the connection setup message;

establishing respective ATM virtual connections from individual data handlers to the ATM switch;

sending respective portions of a continuous data stream from the individual data handlers over said respective ATM virtual connections;

the ATM switch merging the respective virtual connections from the data handlers into the single point-to-point ATM virtual connection to the end-point device, wherein the requesting end-point device receives the single continuous data stream over the single ATM virtual connection from the selected one of the switch ports.

6. A method as recited in claim 5 wherein the step of selecting the switch port is based on the available bandwidth of the switch port relative to other switch ports.

7. A method as recited in claim 5 wherein the step of selecting the switch port is performed by the ATM switch based on the available bandwidth of the switch port relative to other switch ports.

8. A method as recited in claim 5, further comprising designating the selected switch port in at least one of the multipoint-to-point connection setup messages.

9. A method as recited in claim 5, the selected switch port implementing the user side of a standard ATM public user-to-network interface.

10. A method as recited in claim 5, further comprising designating a requested cell rate in at least one of multipoint-to-point connection setup messages to the ATM switch.

11. A method as recited in claim 5, further comprising designating a requested cell rate and a derating factor in at least one of multipoint-to-point connection setup messages to the ATM switch.

12. A method as recited in claim 5, further comprising designating in each of the multipoint-to-point connection setup messages a requested cell rate for the respective ATM virtual connections from the individual data handlers.

13. A method as recited in claim 5, further comprising designating in each of the multipoint-to-point connection setup messages a requested peak cell rate for the respective ATM virtual connections from the individual data handlers.

14. A method as recited in claim 5, further comprising designating in each of the multipoint-to-point connection setup messages a requested sustainable cell rate for the respective ATM virtual connections from the individual data handlers.

15. A method as recited in claim 5, further comprising designating in each of the multipoint-to-point connection setup messages a requested peak cell rate and a requested sustainable cell rate for the respective ATM virtual connections from the individual data handlers, the requested sustainable cell rate being less than the requested peak cell rate.

16. A method as recited in claim 5, further comprising designating in each of the multipoint-to-point connection setup messages the ATM addresses of the data handlers, the ATM switch performing the step of establishing the respective ATM virtual connections from the individual data handlers to the ATM switch.

17. A method of supplying a continuous data stream from a plurality of data handlers through an ATM switch, the ATM switch having a plurality of switch ports for connection to the data handlers and to a public ATM network, each data handler being configured to supply respective portions of the continuous data stream to a requesting end-point device through the public ATM network, the method comprising the following steps:
receiving a data request at a single ATM address from a requesting end-point device, said data request including the ATM address of the requesting end-point device;
in response to receiving said data request from the requesting end-point device, signaling individual data handlers to supply their respective portions of the individual data stream to the requesting end-point device;
in response to said signaling, each data handler sending a multipoint-to-point connection setup message to the ATM switch, said connection setup message specifying an ATM virtual connection to the requesting end-point device;
the ATM switch receiving the multipoint-to-point connection setup messages and in response to each such message:
establishing an ATM virtual connection from the sending data handler to the ATM switch;
if the specified virtual connection to the requesting end point device is not yet established, sending a connection setup message to establish a single point-to-point ATM virtual connection from a selected switch port of the ATM switch to the requesting end-point device, said selected switch port having its own ATM address which is used as the calling party address in the connection setup message;
establishing an ATM virtual connection from the sending data handler to the ATM switch;
mapping the established ATM virtual connection from the sending data handler to the established ATM virtual connection to the requesting end-point device;
sending respective portions of the continuous data stream from the sending data handlers to the ATM switch over the ATM virtual connections from the sending data handlers;
merging the respective virtual connections from the data handlers into the single point-to-point ATM virtual connection to the end-point device, wherein the requesting end-point device receives the single continuous data stream over the single ATM virtual connection from the selected one of the switch ports, the virtual connection to the end-point device appearing to the end-point device as a standard ATM point-to-point connection from a single ATM end-point.

18. A method as recited in claim 17 and further comprising selecting said selected switch port of the ATM switch based on the available bandwidth of the switch port relative to other switch ports.

19. A method as recited in claim 17 and further comprising selecting said selected switch port of the ATM switch to balance the loads of the respective switch ports.

20. A method as recited in claim 17 and further comprising selecting said selected switch port of the ATM switch by determining which of the switch ports has the lowest loading.

21. A method as recited in claim 17, said selected switch port of the ATM switch implementing the user side of a standard ATM public user-to-network interface.

22. A method of supplying a continuous data stream from a plurality of data handlers through an ATM switch, the ATM switch having a plurality of switch ports for connection to the data handlers, to a controller associated with the data handlers, and to a public ATM network; each data handler being configured to supply respective portions of the continuous data stream to a requesting end-point device through the public ATM network, the method comprising the following steps:
sending a data request from a requesting end-point device to the controller, said data request including the ATM address of the requesting end-point device;
in response to said data request, sending one or more multipoint-to-point connection setup messages to the ATM switch, the multipoint-to-point connection setup messages specifying the ATM addresses of the individual data handlers and the ATM address of the requesting end-point device;
the ATM switch receiving the multipoint-to-point connection setup messages and in response:
establishing respective ATM virtual connections from individual data handlers to the ATM switch;
selecting one of the switch ports from among the plurality of switch ports of the ATM switch;
sending a connection setup message to establish a single point-to-point ATM virtual connection from the selected switch port of the ATM switch to the requesting end-point device, said selected switch port having its own ATM address which is used as the calling party address in the connection setup message;
sending respective portions of a continuous data stream from the individual data handlers over said respective ATM virtual connections;
the ATM switch merging the respective virtual connections from the data handlers into the single point-to-point ATM virtual connection to the requesting end-point device, wherein the requesting end-point device receives the single continuous data stream over the single ATM virtual connection from the selected one of the switch ports, the virtual connection to the end-point device appearing to the end-point device as a standard ATM point-to-point connection from a single ATM end-point.

23. A method as recited in claim 22 wherein the step of selecting the switch port is performed based on the available bandwidth of the switch port relative to other switch ports.

24. A method as recited in claim 22 wherein the step of selecting the switch port is performed to balance the loads of the respective switch ports.

25. A method as recited in claim 22 wherein the step of selecting the switch port selecting is performed by determining which of the switch ports has the lowest loading.

26. A method as recited in claim 22, the selected switch port implementing the user side of a standard ATM public user-to-network interface.

27. A method as recited in claim 22, further comprising designating in the multipoint-to-point connection setup message a requested peak cell rate for the respective ATM virtual connections from the individual data handlers.

28. A method as recited in claim 22, further comprising designating in the multipoint-to-point connection setup message a requested peak cell rate and a requested sustainable cell rate for the respective ATM virtual connections from the individual data handlers, the requested sustainable cell rate being less than the requested peak cell rate.

29. A system for supplying a continuous data stream to a requesting end-point device through a public ATM network, comprising:

an ATM switch having a plurality of switch ports for connection to the public ATM network;

a plurality of data handlers that cooperate to supply the continuous data stream, each data handler being connected to communicate through the ATM switch;

a controller connected to communicate with the public ATM network, the controller having an ATM address;

the controller being configured to receive a data request directed to the ATM address of the controller from the requesting end-point device, wherein in response to receiving said data request the controller (a) establishes respective ATM virtual connections from the data handlers to the ATM switch; and (b) establishes a single point-to-point ATM virtual connection from a selected one of the switch ports of the ATM switch to the requesting end-point device, said selected switch port having its own ATM address which is used as the calling party address in establishing the single ATM virtual connection;

the ATM switch being configured to merge the respective virtual connections from the data handlers into the single point-to-point ATM virtual connection to the end-point device, wherein the requesting end-point device receives the single continuous data stream over the single ATM virtual connection from the selected one of the switch ports.

30. A system as recited in claim 29 wherein one of the data handlers is configured to function as the controller.

31. A system as recited in claim 29 wherein the controller is external to the ATM switch.

32. A system as recited in claim 29 wherein the controller is configured to choose the selected switch port based on the available bandwidth of the switch port relative to other switch ports.

33. A system as recited in claim 29 wherein the selected switch port implements the user side of a standard ATM public user-to-network interface.

* * * * *